United States Patent [19]
Matsuura et al.
[11] Patent Number: 4,667,210
[45] Date of Patent: May 19, 1987

[54] HEAD CONNECTION STRUCTURE OF PRINTER

[75] Inventors: Takanobu Matsuura, Takizawa; Toshiyuki Yamamoto, Tamayama, both of Japan

[73] Assignee: Alps Electric Co., Ltd., Japan

[21] Appl. No.: 793,683

[22] Filed: Oct. 31, 1985

[30] Foreign Application Priority Data

Oct. 31, 1984 [JP] Japan .......................... 59-163749[U]

[51] Int. Cl.[4] ............................................ G01D 15/16
[52] U.S. Cl. ................................ 346/139 R; 219/216
[58] Field of Search .......................... 346/139, 76 PH; 219/216 PH; 339/75 MP

[56] References Cited

U.S. PATENT DOCUMENTS

| | | | |
|---|---|---|---|
| 4,130,752 | 12/1978 | Conta | 346/76 PH |
| 4,190,311 | 2/1980 | Basta | 339/75 MP |
| 4,357,061 | 11/1982 | Crosby | 339/75 MP |
| 4,361,844 | 11/1982 | Nozaki | 346/76 PH |
| 4,390,884 | 6/1983 | Applegate | 346/76 PH |

*Primary Examiner*—E. A. Goldberg
*Assistant Examiner*—Mark Reinhart
*Attorney, Agent, or Firm*—Guy W. Shoup

[57] ABSTRACT

A head connection structure of a printer including a carriage with a flexible circuit sheet and a thermal head with another mating circuit sheet, comprises a cap board positioned detachably on the carriage and a positioning guide pin provided on the carriage. Both circuit sheets are held by and between the cap board and the carriage with the circuit sheet of the thermal head being positioned accurately by the guide pin.

3 Claims, 4 Drawing Figures

HEAD CONNECTION STRUCTURE OF PRINTER

BACKGROUND OF THE INVENTION

1. Field of the Invention

This invention relates to a printer employing a thermal head and, particularly, to a head connection structure of the type wherein a thermal head mounted on a carriage is connected through a flexible circuit sheet to a control circuit section provided in a printer body.

2. Description of the Prior Art

In the printer employing the thermal head, the lifetime of the thermal head is generally short in comparison to the lifetime of the printer itself, thus, a structure which permits exchange only of thermal heads was employed.

As such thermal head-exchangable structures, hitherto, an arrangement was known in which a flexible circuit sheet connected to a control circuit section is secured on a carriage, a thermal head and a circuit sheet connected to respective resistors of the thermal head are independently positioned detachably on the carriage, and both circuit sheets are connected together via a connector.

In this conventional example, the exchange work for a worn-out thermal head may easily be completed, after disconnecting both circuit sheets at a connector portion, by connecting again a new thermal head and a circuit sheet be connected to that new thermal head, to the circuit sheet on the side of the control circuit section at the connector portion. However, there existed the drawback that the known structure is of a high cost because the connector is employed as connecting means for both circuit sheets.

SUMMARY OF THE INVENTION

It is the object of the present invention to provide a head connection structure of a printer which is free from the foregoing drawback of the prior art and can achieve the exchange work of thermal heads with no employment of a connector, at low costs.

In order to achieve the foregoing object, the present invention features the structure in that a cap board is positioned detachably on a carriage, a guide pin is provided on the carriage to position a circuit sheet be connected to a thermal head, whereby under the state where the circuit sheet connected to the thermal head and another circuit sheet connected to a control circuit section are positioned accurately by the guide pin, both circuit sheets are held by and between the carriage and the cap board locked on the carriage.

DESCRIPTION OF THE PREFERRED EMBODIMENT

The embodiment of the present invention will be described with reference to the drawings.

Figure 1:
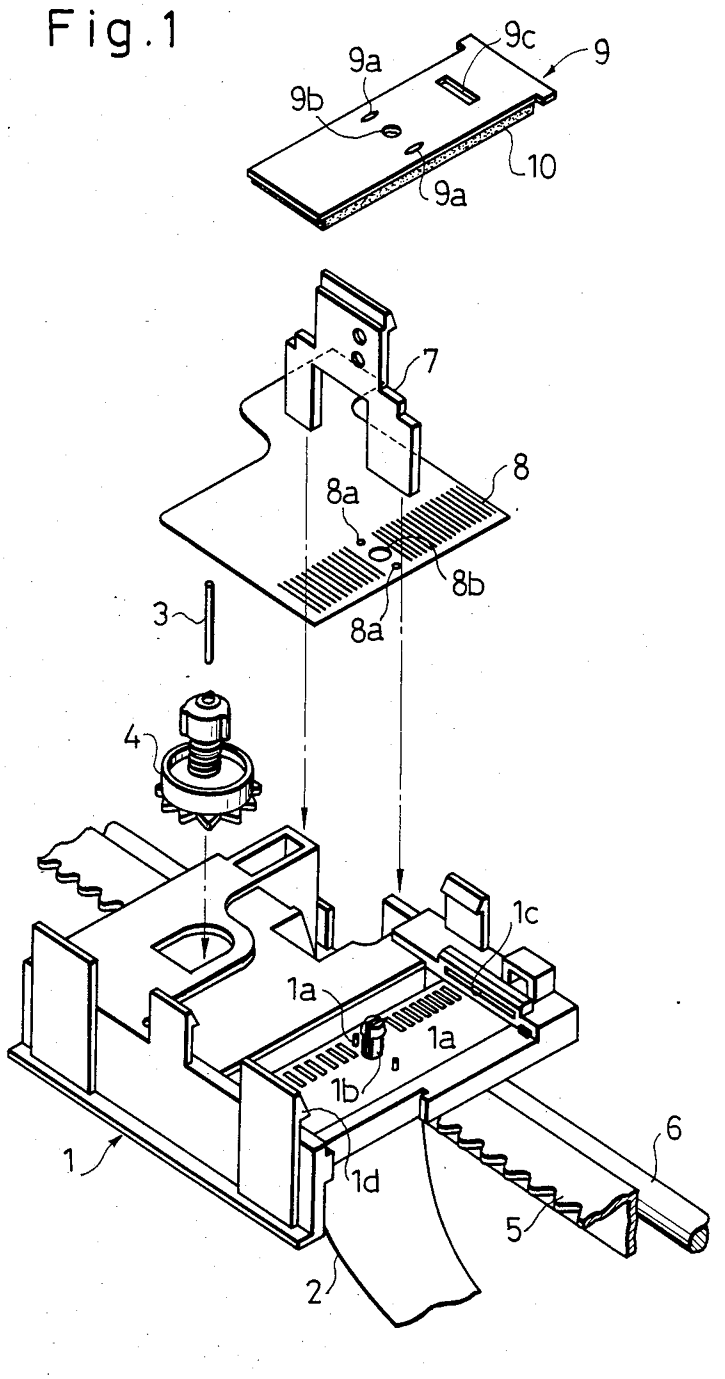
FIG. 1 is an exploded perspective view of the important portion of an embodiment according to the present invention.
Figure 2:
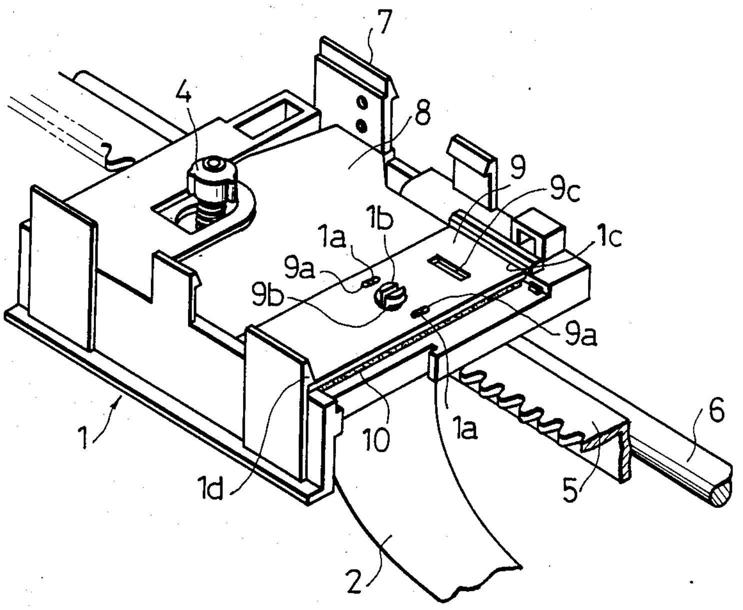
FIG. 2 is a perspective view showing the assembled state of the embodiment shown in FIG. 1.

FIG. 1 is the exploded perspective view of a head connection structure according to the embodiment of the present invention, and FIG. 2 is the perspective view showing the assembled state of the head connection structure shown in FIG. 1.

In these drawings, 1 is a carriage, 2 is a first circuit sheet made of a flexible insulating sheet on which a conductive pattern is formed, one end of the first circuit sheet 2 is secured on the carriage 1 by the use of rubber-series bonding material (not shown), and the other end is connected to a control circuit section (not shown). Inside the carriage 1 a pinion 4 is supported rotatably by a supporting shaft 3, and this pinion 4 is in gear with a rack 5 provided on the side of a printer body (not shown). The under face of the carriage 1 is fitting slidably on a guide shaft 6 provided on the side of the printer body, and the carriage 1 is moved reciprocatingly along the rack 5 and guide shaft 6 by a driving means (not shown).

On the upper face of the carriage 1 two positioning guide pins 1*a* mutually spaced a certain distance are provided, further, a lock pawl 1*b* of a two-split shape is provided at the middle position between the two guide pins 1*a*, and these guide pins 1*a* and lock pawl 1*b* pass through the first circuit sheet 2. On both side walls a stepped lock portion 1*c* and an elastic lock pawl 1*d* are provided as to face mutually through the first circuit sheet 2.

7 is a thermal head which is designed so that it is fitted and stationarily mounted detachably on one side portion of the carriage 1. 8 is a second circuit sheet made of a flexible insulating sheet on which a conductive pattern is formed, and designed so that in the state where the thermal head 7 is mounted on the carriage 1, a number of resistors (not shown) provided in the thermal head 7 are electrically in connection with the conductive pattern of the second circuit sheet 8. The second circuit sheet 8 is bored with two positioning holes 8*a* into which the guide pins 1*a* fit, and a through-hole 8*b* at the middle position between the two holes 8*a* through which the lock pawl 1*b* passes.

9 is a cap board to press the first and second circuit sheets 2, 8 against the carriage 1 and hold therebetween, in this cap board 9 there are bored two elongate holes 9*a* to make the two guide pins 1*a* free, a lock hole 9*b* lockable with the lock pawl 1*b*, and a hook hole 9*c*, and on the under face of the cap board 9 an elastic board 10 made of sponge, rubber, etc. is bonded.

Now, the exchange work of the thermal head 7 in the present embodiment will be described with reference to FIGS. 1 through 4.

As shown in FIG. 1, after the two holes 8*a* and through-hole 8*b* of the second circuit sheet 8 are fitted, respectively, with the guide pins 1*a* and lock pawl 1*b* of the carriage 1, the thermal head 7 is fitted and secured on the carriage 1, and the second circuit sheet 8 is piled on the first circuit sheet 2. At this stage, the first circuit sheet 2 and second circuit sheet 8 are mutually positioned accurately through fitting of the guide pins 1*a* into the holes 8*a*, thus, the corresponding terminals of both circuit sheets 2, 8 are mutually connected at desired portions.

Figure 3:
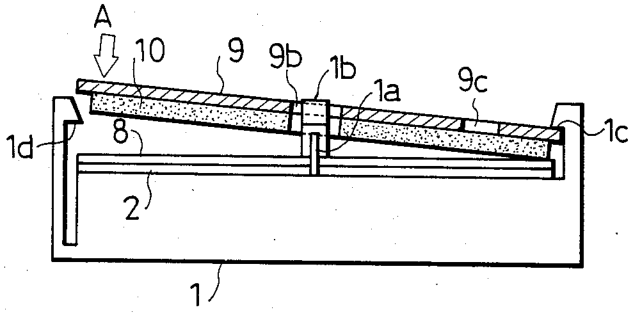
FIGS. 3 and 4 are explanatory views showing the exchange work of thermal heads.
Figure 4:
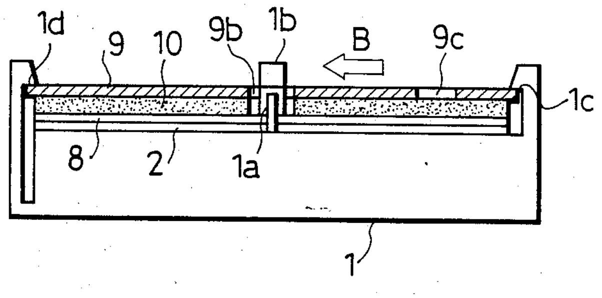

Then, as shown in FIG. 3, with one end of the cap board 9 set in the stepped lock portion 1*c*, the other end of the cap board 9 is pushed down in the arrow A direction. As a result, the elastic lock pawl 1*d* deforms outward due to the cap board 9 and, then, returns to its initial position due to the elastic strength of itself. On the other hand, the two-split lock pawl 1*b* deforms so that these split portions come close to each other due to the peripheral wall of the lock hole 9*b* and, then, returns to its initial position due to the elastic strength of itself. Through the foregoing action, as shown in FIGS. 2 and 4, both side portions and center portion of the cap board 9 are locked, respectively, by the stepped lock portion 1*c,* elastic lock pawl 1*d* and lock pawl 1*b,* whereby the cap board 9 is mounted and secured on the carriage 1. Accordingly, both circuit sheets 2, 8 are held by and between the carriage 1 and cap board 9 locked on the carriage 1, and the respective, corresponding terminals of both circuit sheets 2, 8 are held in the connected state at a suitable degree of contact pressure under receiving the elastic force from the elastic board 10.

At the time of exchanging and renewing the thermal head 7 in the state shown in FIG. 4, first, a suitable tool (not shown) is coupled to the hook hole 9*c* and the cap board 9 is slided in the arrow B direction in opposition to the elastic force of the elastic lock pawl 1*d,* whereby the stepped lock portion 1*c* is released from its locked state with the cap board 9. Then, the two-split lock pawl 1*b* is elastically deformed so that its two split portions come close to each other, whereby coupling between the lock pawl 1*b* and lock hole 9*b* is released, thereafter, the cap board 9 is detached from the carriage 1. Then, the thermal head 7 and second circuit sheet 8 are detached from the carriage 1, after these are exchanged with new ones, by performing the attaching work described hereinabove, the exchange work of the thermal head 7 and second circuit sheet 8 is completed.

Though, in the foregoing embodiment, the cap board 9 is attached detachably to the carriage 1 at the three spots corresponding to the lock pawl 1*b,* stepped lock portion 1*c* and elastic lock pawl 1*d,* the cap board 9 in the present invention should not be limited to the illustrated detachable structure. For example, the cap board 9 can be locked by the use of only the stepped lock portion 1*c* and elastic lock pawl 1*d* with the lock pawl 1*b* omitted. Further, it is also possible to support one end of the cap board 9 rotatably by the carriage 1 and to lock detachably the other end of the cap board 9 on the carriage 1 by the use of the elastic lock pawl 1*d.*

As apparent from the foregoing description, according to the present invenntion, the circuit sheet connected to the thermal head can be connected to the circuit sheet connected to the control circuit section at a high degree of accuracy, without use of a connector, by locking the cap board on the carriage, thus, the present invention can offer the head connection structure of the printer at low costs which permits exchanging of thermal heads.

While the preferred embodiment has been described, variations thereto will occur to those skilled in the art within the scope of the present inventive concepts which are delineated by the following claims.

What is claimed is:

1. A head connection structure of a printer comprising:

a carriage movable in a printing direction and having an upper surface provided with a guide pin and a side wall with an engaging portion;

a print head detachably mounted on said carriage;

a flexible first circuit sheet secured at one end to said carriage and positioned thereon by said guide pin, said one end having an electroconductive portion thereon, wherein the other end of said flexible first circuit sheet is connectable to an external source of control signals for the print head;

a second circuit sheet secured on said carriage and positioned thereon by said guide pin, said second circuit sheet having an electroconductive pattern thereon which is electrically connected to said print head mounted on said carriage and a portion of which is placed in electrical contact with the electroconductive portion of the first circuit sheet;

a retainer plate disposed detachably on said carriage overlying the electroconductive portions of said first and second circuit sheets having one end in engagement with said engaging portion of said carriage and an elastic member disposed on a lower surface of said retainer plate which resiliently abuts against said circuit sheet portions, whereby said circuit sheet portions are mutually held in electrical connection by said elastic member of said retainer plate on said carriage.

2. A head connection structure of a printer as set forth in claim 1, wherein a lock pawl of a two-split shape is further provided on said carriage, a mating through-hole is bored in said circuit sheet connected to said print head, and a mating lock hole is bored in said retainer plate.

3. A head connection structure of a printer as set forth in claim 1, wherein an elastic lock pawl is provided on one side of said carriage to lock detachably one edge of said retainer plate.

* * * * *